G. E. REYNER.
Grubbing-Machines.

No. 156,101.  Patented Oct. 20, 1874.

WITNESSES:
E. Wolff
O. Sedgwick

INVENTOR:
G. E. Reyner
BY
ATTORNEYS.

UNITED STATES PATENT OFFICE.

GEORGE E. REYNER, OF CLAY, IOWA.

IMPROVEMENT IN GRUBBING-MACHINES.

Specification forming part of Letters Patent No. 156,101, dated October 20, 1874; application filed July 3, 1874.

*To all whom it may concern:*

Figure 1:
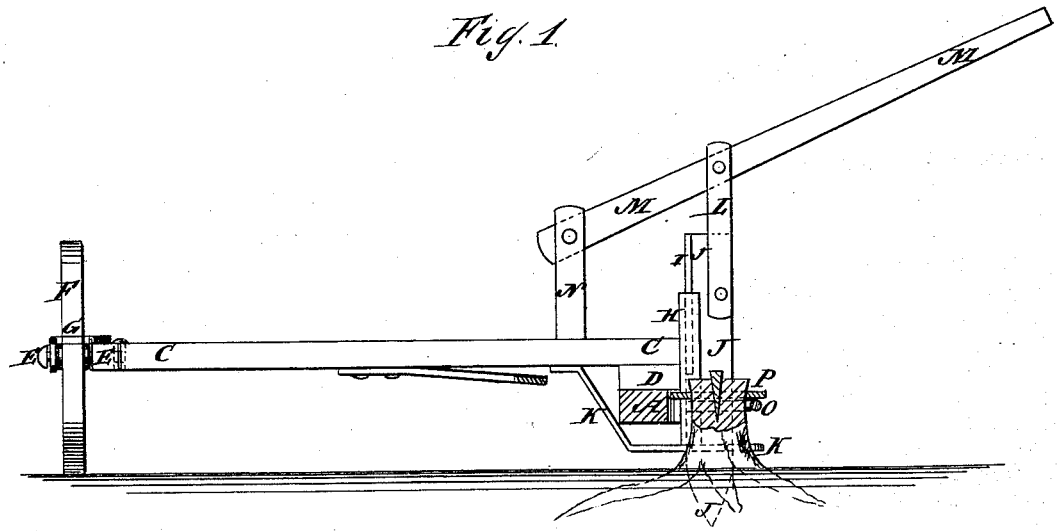
Figure 2:
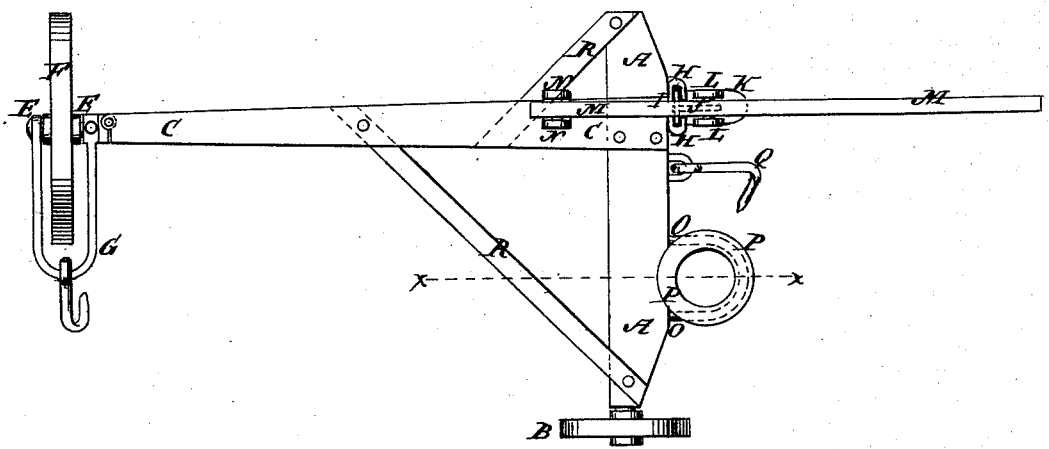

Be it known that I, GEORGE E. REYNER, of Clay, in the county of Jones and State of Iowa, have invented a new and useful Improvement in Grubbing-Machine, of which the following is a specification:

Figure 1 is a side view of my improved machine partly in section through the line $x\ x$, Fig. 2. Fig. 2 is a top view of the same.

Similar letters of reference indicate corresponding parts.

My invention has for its object to furnish an improved machine for grubbing up the stumps of shrubs and small trees, and which shall be simple in construction, convenient in use, and effective in operation, doing its work rapidly and well.

The invention consists in the journal hinged to the forward end of the longitudinal beam, and provided with a wheel and draw-loop; in the combination of the slotted and grooved guide, the guide-plate, the knife or cutter, and its slotted guide plate or bar with the beams of the machine; in the combination of the pivoted connecting-bars, the lever and its standard with the knife or cutter, and with the frame-work of the machine; and in the combination of the loop or staple and the ring with the frame-work that carries the knife and its attachments, as hereinafter fully described.

A represents a cross-beam, upon a journal formed upon or attached to one end of which revolves a small wheel, B. To the cross-beam A, near its other end, is attached the rear end of a beam, C, a block, D, of suitable thickness being interposed between the two beams A and C, to bring them to the proper relative height. To the forward end of the beam C is hinged a journal, E, upon which revolves a wheel, F, considerably larger than the wheel B. The journal E of the wheel F is hinged to the forward end of the beam C in such a way that the said wheel F may be turned back parallel with the beam C, for convenience in drawing the machine from place to place, and turned forward at right angles with said beam C when the machine is at work. To the ends of the hinged journal E are attached the ends of the arms of the loop G, to the forward end or bow of which is attached a hook, or other suitable device, for the convenient attachment of the draft. To the rear end of the beam C, and the rear side of the beam A, is attached a slotted guide, H, in the adjacent edges of which are formed grooves to receive the edges of the guide-plate I, attached to or formed upon the upper part of the forward edge of the knife or cutter J. The lower part of the cutter J passes through a guide-slot in the bar or plate K, which is secured to the bottom of the beam A, projects forward and upward, and its upper end is secured to the beam C, so that the bar or plate K may serve as a shoe for supporting the machine, as a guide to the knife or cutter J, and as a brace to support the draft-strain upon said knife or cutter J. To the opposite sides of the middle part of the knife or cutter J are pivoted the lower ends of two connecting-bars, L, the upper ends of which are pivoted to the opposite sides of the lever M, so that by operating the lever M the knife or cutter J may be raised from the ground, lowered into the ground, and held down to its work. The forward end of the lever M is pivoted to a standard, N, attached to the beam C. To the rear side of the beam A, in such a position as to bring the knife or cutter J at a proper distance from the stump to be operated upon, is secured a staple or loop, O, of such a size as to receive the stump to be operated upon.

In using the machine, it is raised from the ground, and the loop or staple O is dropped over the stump to be operated upon. A ring, P, is then placed upon the stump, and a wedge is driven into the top of the said stump, which spreads it sufficiently to fasten the ring P, while the ring P prevents the staple or loop O from slipping off the stump, and at the same time serves as a band to prevent the wedge from spreading the lower part of the stump, so as to tighten the loop or staple O. The knife or cutter J is then forced into the ground five or six inches, more or less, and the horse is driven around the stump, the knife J cutting off the side roots that may be in its path. At each round the knife or cutter J is forced deeper into the ground until all the side roots have been cut off. The hook Q, attached to the rear side of the beam A, between the knife J and staple or loop O, is then dropped to the ground, and is held down with the foot until it catches upon a root, when a few rounds will twist off the top root, and allow the stump to be raised from the ground. The connection between the cross-beam A and the longitudinal beam C is strengthened by the inclined braces R, the rear ends of which are attached to the end parts of the said cross-beam A, and their forward ends are attached to the said longitudinal beam C.

Having thus described my invention, I claim as new and desire to secure by Letters Patent—

1. A vehicle for stump-grubbing, consisting essentially of the cross-beam A, provided with wheel B, pivoted hook Q, and loop O, and the longitudinal beam C, having support K and wheel F on hinged journal, as shown and described, to allow it not only to be drawn from place to place, but to be centered and anchored to each stump, and to be moved around it in the manner described.

2. The combination, with a stump-centering and circularly-traveling vehicle, substantially as described, of a knife, J, to cut the lateral roots around the stump, in the manner set forth.

3. The combination, with a stump-centering and circularly-traveling vehicle, substantially as described, of a pivoted root hook or fastener Q, substantially as set forth, to rotate the stump until the top root is twisted off.

4. The combination, with loop O, of the ring and wedge in the manner specified, so that the wedge expresses the wood fiber against the ring to prevent its escape while the ring holds the loop down, and prevents the wood from binding in the loop.

GEORGE E. REYNER.

Witnesses:
   J. T. BAYLIFF,
   P. J. JENKINS.